(12) United States Patent
Solomon

(10) Patent No.: US 12,360,295 B2
(45) Date of Patent: Jul. 15, 2025

(54) PATTERNED LIGHT CONTROL FILM

(71) Applicant: 3M INNOVATIVE PROPERTIES COMPANY, St. Paul, MN (US)

(72) Inventor: Jeffrey L. Solomon, Centerville, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 771 days.

(21) Appl. No.: 17/296,789

(22) PCT Filed: Dec. 11, 2019

(86) PCT No.: PCT/IB2019/060661
§ 371 (c)(1),
(2) Date: May 25, 2021

(87) PCT Pub. No.: WO2020/128730
PCT Pub. Date: Jun. 25, 2020

(65) Prior Publication Data
US 2022/0011474 A1    Jan. 13, 2022

Related U.S. Application Data

(60) Provisional application No. 62/781,883, filed on Dec. 19, 2018.

(51) Int. Cl.
*G02B 5/00*  (2006.01)
*G02B 5/22*  (2006.01)

(52) U.S. Cl.
CPC ............ *G02B 5/003* (2013.01); *G02B 5/223* (2013.01)

(58) Field of Classification Search
CPC ................................ G02B 5/003; G02B 5/223
See application file for complete search history.

(56) References Cited

U.S. PATENT DOCUMENTS

| | | |
|---|---|---|
| 6,649,249 B1 | 11/2003 | Engle |
| 7,419,272 B2 | 9/2008 | Schenke |
| 8,096,667 B2 | 1/2012 | Boyd |
| 8,213,082 B2 | 7/2012 | Gaides |

(Continued)

FOREIGN PATENT DOCUMENTS

| | | | |
|---|---|---|---|
| JP | 2000352608 A | | 12/2000 |
| JP | 2009-217165 | | 9/2009 |
| JP | 2009217165 A | * | 9/2009 |

OTHER PUBLICATIONS

Bond, Tami C., and Robert W. Bergstrom. "Light absorption by carbonaceous particles: An investigative review." Aerosol science and technology 40.1 (2006): 27-67. (Year: 2006).*

(Continued)

*Primary Examiner* — Michael Zhang
(74) *Attorney, Agent, or Firm* — Jonathan L. Tolstedt

(57) ABSTRACT

Light control films have a pattern applied to it. The light control film has a plurality of spaced apart first grooves in an optical medium. Each first groove has a closed bottom. Some of the first grooves are partially filled with a light absorbing first material that absorbs light of a predetermined wavelength range of from 400 to 2000 nm. The light absorbing first material defines an unfilled void region inside the first groove extending from a bottom surface of the light absorbing first material to the closed bottom of the first groove.

12 Claims, 5 Drawing Sheets

(56) References Cited

U.S. PATENT DOCUMENTS

| | | |
|---|---|---|
| 9,366,790 B2 | 6/2016 | Spurgeon |
| 9,740,018 B1 | 8/2017 | Ouderkirk |
| 2012/0200930 A1 | 8/2012 | Yamamoto et al. |
| 2013/0329401 A1* | 12/2013 | Yamamoto ........... G02B 5/0247 430/321 |
| 2014/0353645 A1 | 12/2014 | Jeong et al. |
| 2015/0062492 A1* | 3/2015 | Yamamoto ........ G02F 1/133524 349/64 |
| 2018/0120581 A1 | 5/2018 | Ouderkirk |

OTHER PUBLICATIONS

International Search Report for PCT International Application No. PCT/IB2019/060661, mailed on Feb. 18, 2019, 4 pages.
Extended European Search Report for 19900800.4, mailed on Aug. 1, 2022, 9 pages.

* cited by examiner

PATTERNED LIGHT CONTROL FILM

FIELD OF THE DISCLOSURE

The current disclosure relates to light control films onto which a pattern has been applied and the methods of making such films.

BACKGROUND

Light control film (LCF), also known as light collimating film, is an optical film configured to regulate the transmission of light. LCFs include a light transmissive film having a plurality of parallel grooves formed of a light-absorbing material.

LCFs can be placed proximate to a display surface, image surface, or other surface to be viewed. At normal incidence, (i.e. 0 degree viewing angle) where a viewer is looking at an image through the LCF in a direction that is perpendicular to the film surface, the image is viewable. As the viewing angle increases, the amount of light transmitted through the LCF decreases until a viewing cutoff angle is reached where substantially all (greater than about 95%) the light is blocked by the light-absorbing material and the image is no longer viewable. The LCF provides privacy to a viewer by blocking observation by others that are outside a typical range of viewing angles.

SUMMARY

The disclosure relates to light control films onto which a pattern has been applied and the methods of making such films. In some embodiments, the light control film (100) comprises a plurality of spaced apart first grooves (10) at least partially embedded in an optical medium (20) between major first (21) and second (22) surfaces of the optical medium. Each first groove has a closed bottom (11), a maximum height H in a thickness direction (z) of the light control film, and a maximum width W in a width direction (x) of the light control film perpendicular to the thickness direction, H/W≥1. At least some of the first grooves are partially filled with a light absorbing first material (30) substantially absorbing light of a first predetermined wavelength range (40) or of a first wavelength in the predetermined wavelength range, where the predetermined wavelength range is selected from the range extending from about 400 to about 2000 nm. The light absorbing first material defines an unfilled void region (50) inside the first groove extending from a bottom surface (31) of the light absorbing first material to the closed bottom of the first groove.

In another embodiment, the light control film (100) comprises a plurality of spaced apart first grooves (10) at least partially embedded in an optical medium (20) between major first (21) and second (22) surfaces of the optical medium. The optical medium is substantially transparent at each wavelength in a predetermined wavelength range (40) extending from about 400 to about 600 nm. Each first groove has a closed bottom (11), a maximum height H in a thickness direction (z) of the light control film, and a maximum width W in a width direction (x) of the light control film perpendicular to the thickness direction, H/W≥1. Each first groove is at least partially filled with a multilayer, where the multilayer is stacked (90) in the thickness direction. The multilayer comprises a first polymeric layer (91) substantially transparent at each wavelength in the predetermined wavelength range and extending to the closed bottom of the first groove, and a second polymeric layer (92) disposed on the first layer.

In yet another embodiment, the light control film (200) comprises alternating linear first (210) and second (220) regions extending along a length (y) of the light control film. Each first region is disposed between substantially parallel opposing major first (201) and second (202) surfaces of the light control film. Each first region comprises a light absorbing portion (230) extending downwardly from a top (231) of the first region proximate the major first surface of the light control film to a middle (211) of the first region. The light absorbing portion defines an air-filled cavity (240) within the first region extending from a bottom surface (232) of the light absorbing portion to a closed bottom (212) of the first region. The closed bottom faces, and is spaced apart from, a major surface (203) of the light control film closest to the closed bottom.

Also disclosed are methods of fabricating light control films. In some embodiments, the method of fabricating a light control film (100), comprises the steps of: providing an optical medium (310) comprising opposing major top (311) and bottom (312) surfaces and defining a plurality of a first class of first grooves (320) therein, each first groove extending from an open top (321) of the first groove at the major top surface of the optical medium to a closed bottom (322) of the first groove spaced apart from the major bottom surface of the optical medium. A light absorbing liquid first material (330) is applied to the major top surface of the optical medium, the liquid first material substantially absorbing light of at least a first wavelength (41) in a predetermined wavelength range (40) extending from about 400 to about 600 nm. The liquid first material is sufficiently viscous so as to only partially fill each first groove with the liquid first material and leaving an unfilled void region (340) inside the first groove extending from a bottom surface (331) of the liquid first material to the closed bottom of the first groove. The excess liquid first material is removed from the major top surface of the optical medium. The liquid first material is cured in each first groove resulting in a solid first material (350) only partially filling each first groove.

BRIEF DESCRIPTION OF THE DRAWINGS

The present application may be more completely understood in consideration of the following detailed description of various embodiments of the disclosure in connection with the accompanying drawings.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Light control film (LCF), also known as light collimating film, is an optical film configured to regulate the transmission of light. LCFs include a light transmissive film having a plurality of parallel grooves formed of a light-absorbing material. In some instances, it can be desirable to include a pattern or image on the light control film. Examples of such films include, for example, ones which contain a variation in color and/or pattern so as to appear more like natural materials and less like a film article. Such films are sometimes called "camouflage films". Additionally, it may be desirable that the pattern or image only be visible from some angles. However, if a pattern or image is printed onto an LCF, the pattern or image can interfere with the overall transmission of the light, and the image or pattern can be viewable from all angles.

This disclosure describes articles and methods that comprise a pattern or image placed preferentially into the microreplicated area of an LCF. Example films could, for example be a solar roof film that has controlled variation in color and/or pattern to appear more like natural materials. Films of this disclosure provide a change in color and/or pattern with angle so an image might be visible in the film when viewed at an angle from normal but much less visible when viewed at normal incidence. The combination of the microstructure, and printed images into the structure, provide images whose visibility is angle dependent. Films of this disclosure, for example, enable a subtle pattern to be printed into an LCF where the pattern is visible off-axis to aid privacy or improve yield, by hiding defects, while the desirable on axis light transmission is maintained. This higher on axis light transmission is relative to an image printed under or over the LCF because the material forming the image is present predominately in the microreplicated region not under or over the clear channel area of the film.

Figure 1:
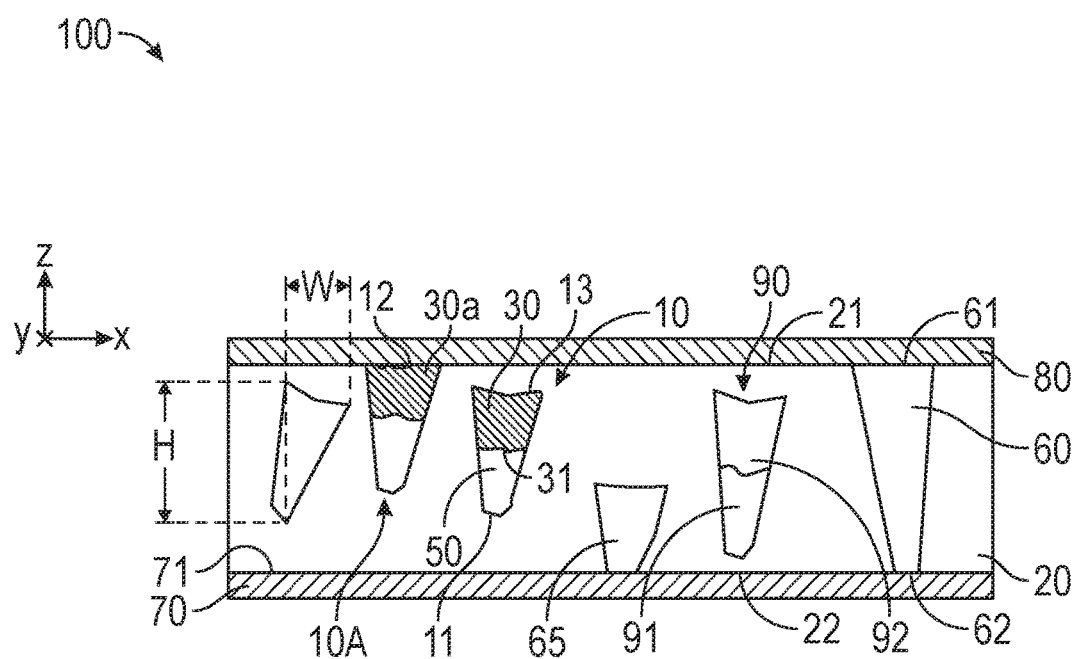
FIG. 1 is a cross-sectional view of an embodiment of a light control film of the present disclosure.

A number of embodiments of patterned light control films are disclosed herein. The Figures illustrate a number of these embodiments and are described in greater detail below. FIG. 1 shows a cross-sectional view of light control film (LCF) 100. In this drawing, the plane of the cross-sectional view is defined as the z-x plane, where the z direction defines the height or thickness of the LCF and x defines the width of the LCF and is perpendicular to the z direction. The y direction (coming out from the x-z plane) is defined as the length of the LCF. LCF 100 comprises a plurality of spaced apart first grooves 10 at least partially embedded in an optical medium 20. Optical medium 20 has a first major surface 21 and a second major surface 22. Each first groove 10 has a closed bottom 11, a maximum height H in a thickness direction (z), and a maximum width W in a width direction (x), such that H/W≥1. Wide variation is possible in the plurality of first grooves 10. At least some of the first grooves 10 are partially filled with a light absorbing first material 30, where light absorbing first material 30 substantially absorbs light of at least a first wavelength in a predetermined wavelength range extending from about 400 to about 2000 nm. The light absorbing first material 30 defines an unfilled void region 50, where the void region within the first groove extends from 31, the bottom surface of the light absorbing first material 30, to 11, the closed bottom of the first groove.

The LCF of FIG. 1 shows a variety of first grooves. As shown in FIG. 1, the first grooves need not all be identical. First groove 10a, in the plurality of spaced apart first grooves, comprises an open top 12, and is adjacent to a first groove that has closed top 13. In groove 10a, the light absorbing first material 30a of the first groove extends to substantially the open top 12 of the first groove. The first material 30a defines a void region 50 as was previously described. In the first groove with a closed top 13, the light absorbing first material 30 defines a void region 50 as was previously described.

The LCF of FIG. 1 further comprises at least one second groove 60 having an open top 61 at the major first surface of the optical medium and an open bottom 62 at the major second surface of the optical medium. FIG. 1 further shows second groove 65 which has a closed top that is not proximate to the major first surface of the optical medium and an open bottom at the major second surface of the optical medium.

In FIG. 1, the optical medium is disposed on a substrate 70. The major second surface of the optical medium 20 is coincident with a major surface 71 of the substrate. A wide variety of substrates are suitable for substrate 70. In some embodiments substrate 70 is a rigid substrate, in other embodiments, substrate 70 is a flexible substrate.

The LCF of FIG. 1 further comprises cover layer 80 disposed on the major first surface of the optical medium. A wide variety of cover layers are suitable for cover layer 80. In some embodiments cover layer 80 is a rigid substrate, in other embodiments, cover layer 80 is a flexible substrate.

The first grooves of the LCF of FIG. 1 each has a maximum height H in the thickness direction (z). In some embodiments, the first grooves are all of the same maximum heights, in other embodiments, at least two first grooves have different maximum heights.

The first grooves of the LCF of FIG. 1 each has a maximum width W in the width direction (x). In some embodiments, the first grooves are all of the same maximum widths, in other embodiments, at least two first grooves have different maximum widths.

In some embodiments, the first grooves in the plurality of spaced apart first grooves have substantially equal maximum heights and equal maximum widths. While the first grooves can have a wide variety of shapes, in some embodiments, at least one first groove in the plurality of spaced apart first grooves, tapers from a wider top 13 proximate the major first surface of the optical medium to a narrower closed bottom 11 facing the major second surface of the optical medium.

The first grooves of the LCF of FIG. 1 each has a maximum length L in a length direction y, where y is perpendicular to the thickness (z) and width (x) directions, such that L/H≥20. The length L is described in greater detail below with regard to FIGS. 3 and 4. In some embodiments the first grooves are all of the same lengths, in other embodiments, at least two first grooves have different maximum lengths. In some embodiments, each first groove extends substantially along an entire length of the light control film.

In the first grooves that contain light absorbing first material, the light absorbing first material 30 fills at least 20% of a total volume defined by the first groove. In some embodiments, the light absorbing first material fills between 20% to 70% of a total volume defined by the first groove.

The light absorbing first material 30 substantially absorbs light of at least a first wavelength in a predetermined wavelength range extending from about 400 to about 2000 nm. In some embodiments, the light absorbing first material substantially absorbs light at each wavelength in the predetermined wavelength range. In other embodiments, the first wavelength is between about 400 to about 1500 nm. In yet other embodiments, the first wavelength is between about 400 to about 1000 nm, or between about 400 to about 800 nm, or even between about 400 to about 700 nm.

In other embodiments, rather than at a specific wavelength, the light absorbing first material substantially absorbs light at each wavelength in the predetermined wavelength range. In a specific embodiment, the light absorbing first material substantially absorbs light at each wavelength in a wavelength range extending from about 400 to about 700 nm. In other embodiments, the light absorbing first material substantially absorbs light in a single primary color wavelength range of a visible spectrum. In some embodiments, the single primary color is blue, in other embodiments, the single primary color is green, in still other embodiments, the single primary color is red.

The light absorbing first material 30 can comprise a wide range of materials. Typically, light absorbing first material 30 comprises and ink, a dye, or a pigment. In some embodiments, light absorbing first material 30 comprises one or more of a black dye and a black pigment. In other embodiments, the light absorbing first material 30 comprises one or more of a blue dye, a green dye, a red dye, a yellow dye, a cyan dye, a magenta dye.

Figure 2:
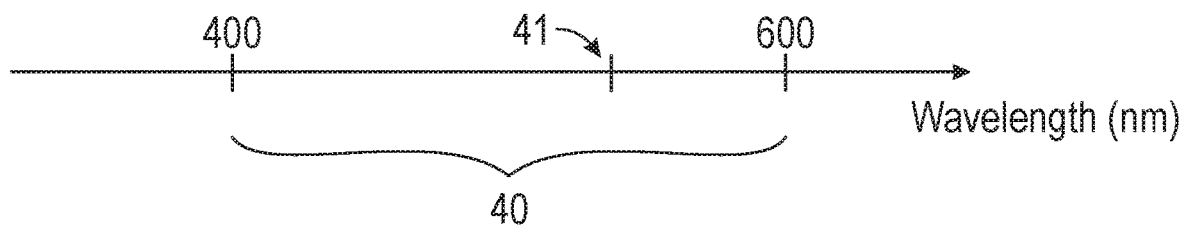
FIG. 2 is a view of a portion of the electromagnetic spectrum.

FIG. 1 additionally shows first groove 90 which is embedded in the optical medium 20 between the major first surface 21 and the major second surface 22. In these embodiments, the optical medium 20 is substantially transparent to light of a predetermined wavelength range extending from about 400 to about 600 nm. First groove 90 may be present in addition to the first grooves 10 and 10a described above or instead of these grooves. In first groove 90, rather than the groove being filled with a void 50 and light absorbing first material 30, the groove is filled with a multilayer stack, where the multilayer stack comprises a first polymeric layer 91 that is substantially transparent at each wavelength in the predetermined wavelength range and extending to the closed bottom of the first groove, and a second polymeric layer 92 disposed on the first layer. In some embodiments, the second polymeric layer 92, substantially absorbs light of at least a first wavelength 41 in the predetermined wavelength range 40 as shown in FIG. 2. In some embodiments, the second polymeric layer substantially absorbs light at each wavelength in the predetermined wavelength range 40 as shown in FIG. 2. In other embodiments, the second polymeric layer is substantially transparent to light of at least a first wavelength 41 in the predetermined wavelength range, as shown in FIG. 2. In yet other embodiments, the second polymeric layer is substantially transparent at each wavelength in the predetermined wavelength range, as shown in FIG. 2.

In some embodiments, the first polymeric layer is substantially similar to the optical medium 20. In some embodiments, the difference between indices of refraction of the optical medium and the first polymeric layer is less than about 0.05. In some embodiments, the difference between indices of refraction of the optical medium and the first polymeric layer is less than about 0.02, or even less than about 0.01.

For each first groove 90, each of the first and second polymeric layers fills between 20% and 80% of the total volume defined by the first groove 90.

As described above, FIG. 2 shows a wavelength range 40 and a specific wavelength 41 within the wavelength range 40.

Figure 3:
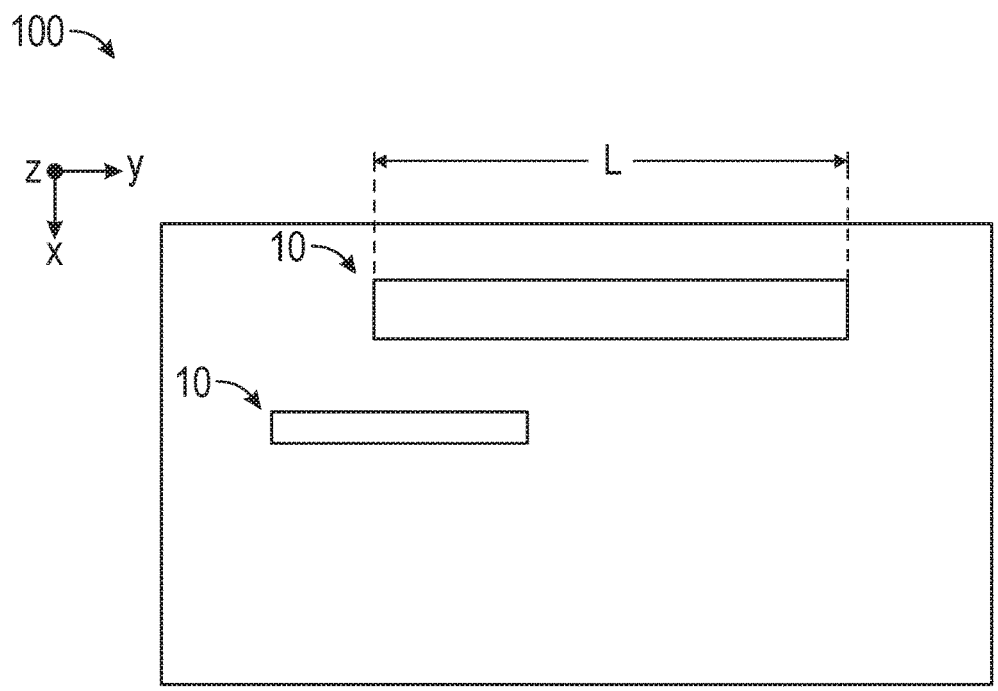
FIG. 3 is a top view of an embodiment of a light control film of the present disclosure.
Figure 4:
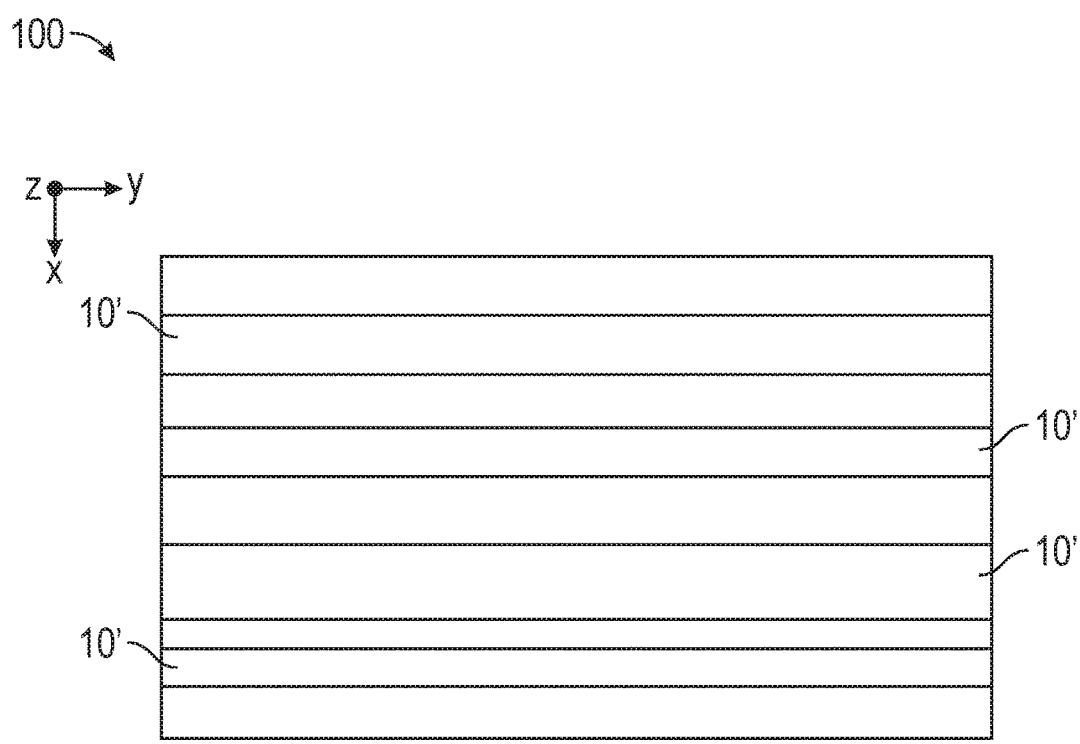
FIG. 4 is a top view of another embodiment of a light control film of the present disclosure.
Figure 5:
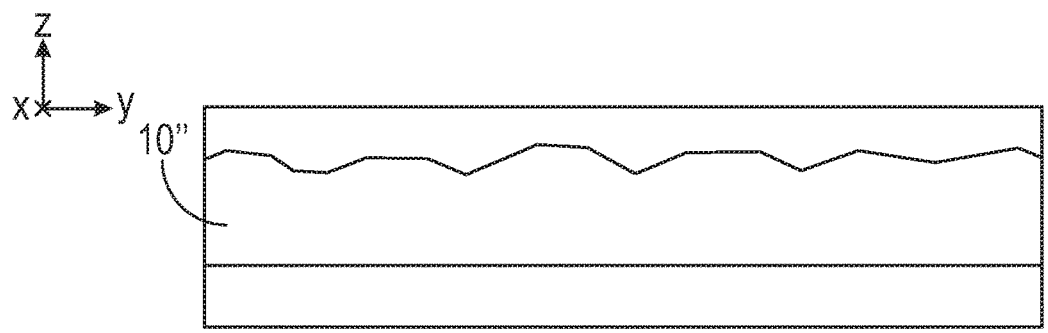
FIG. 5 is a cross-cut view of an embodiment of a light control film of this disclosure.

FIGS. 3-5 show different embodiments for the length L for the LCF 100 of FIG. 1. FIGS. 3 and 4 are top views of article 100, in other words viewing the article from the z direction. In the embodiment of FIG. 3, the two first grooves 10 are different lengths. In the embodiment of FIG. 4, all of the first grooves 10' are of the same length. FIG. 5 shows a side view, that is to say along the y-z plane, showing a cutaway view of a groove 10". FIG. 5 illustrates that the top surface of the groove 10" may not be linear but may be non-linear having a roughened texture.

Figure 6:
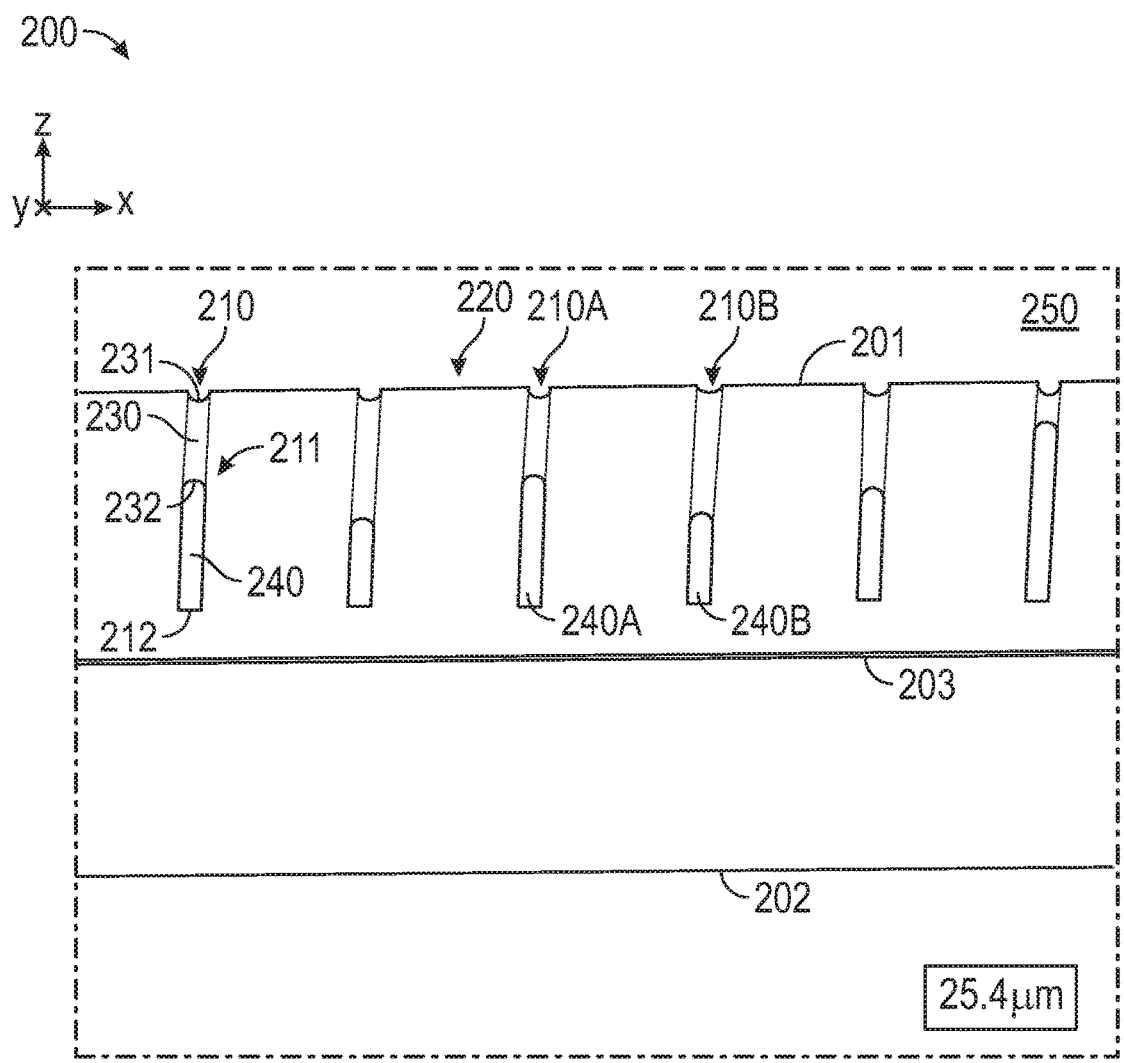
FIG. 6 is a cross-sectional view of another embodiment of a light control film of the present disclosure.

FIG. 6 is a cross-sectional view of another embodiment of an LCF of this disclosure, article 200. In this drawing, the plane of the cross-sectional view 250 is defined as the z-x plane, where the z direction defines the height or thickness of the LCF and x defines the width of the LCF and is perpendicular to the z direction. The y direction (coming out from the x-z plane) is defined as the length of the LCF. Light control film 200 comprises optical medium 203 with substantially parallel opposing major first surface 201 and second surface 202. Major first surface 201 has alternating linear first regions 210 and second regions 220 extending along a length, y direction, of the light control film. Each first region 210 comprises a groove that is partially filled with a light absorbing material. The groove has a top portion 231, middle portion 211, and bottom portion 212. The partially filled groove comprises light absorbing portion 230, and air-filled cavity or void 240. The light absorbing portion 230 fills the region from the top portion of the groove 231 that is proximate the first region 210, and extends downward to middle portion 211 which is the bottom of the light absorbing portion 230, the bottom of the light absorbing portion 230 is 232. The air-filled cavity or void 240 extends from the bottom of the groove 212 to the bottom of the light absorbing material 232. The closed bottoms of the grooves 212 are facing second major surface 202 of the light control film. In the embodiment shown in FIG. 6, exemplary first regions 210a and 210b are partially filled grooves that comprise different levels of light absorbing material and thus different sized air-filled cavities or voids. First region 210a has air-filled cavity or void 240a, and first region 210b has air-filled cavity or void 240b.

Also disclosed herein are methods of preparing light control films. A variety of methods are suitable for preparing the light control films. The methods utilize a precursor optical film which contains at least a first class of spaced apart first grooves and also often comprise a second class of spaced apart first grooves. To this precursor optical film is selectively applied at least one liquid material. A wide variety of liquid materials can be used to prepare the light control films. Some of the liquid materials are liquid light absorbing materials, others are substantially transparent liquid materials. Liquid light absorbing materials are those that upon drying and/or curing form the light absorbing material described above. Substantially transparent liquid materials are those that upon drying and/or curing form materials that are substantially transparent to light of each wavelength of the predetermined wavelength range. By selective application, it is meant that the light absorbing material is applied to some regions of the precursor optical film but not to other locations. The selective application of liquid materials can be done is such a way that the applied light absorbing material forms a recognizable pattern or it may be done in such a way that the applied light absorbing material does not form a recognizable pattern. Examples of recognizable patterns include geometric designs, logos, indicia, and the like. An example of a suitable method of selectively applying liquid materials to the surface of the precursor optical film is printing. Printing can be carried out via a variety of techniques including screen printing, inkjet printing and the like.

In some embodiments, a single liquid first material is used, in other embodiments a combination of liquid first materials is used. Typically, the liquid first material or a combination of liquid first materials, is applied selectively to locations on the surface of the precursor optical films at the locations corresponding to the first class of first grooves. If a single liquid first material is used, it is a light absorbing material, meaning that it substantially absorbs light of at least one wavelength in a predetermined wavelength range. Typically, this liquid first light absorbing material is of a relatively high viscosity. If a combination of liquid materials is used, typically one of the liquid materials is of relatively high viscosity and one is of relatively low viscosity. In some embodiments, a low viscosity liquid material is selectively applied that has a sufficiently low viscosity such that the material flows into the first class of first grooves all the way to the bottom of the bottom of the grooves so as to not leave an air-filled cavity or void in the groove. In some of these embodiments, the low viscosity liquid material is a light absorbing material, and in other embodiments the low viscosity liquid material is a substantially transparent material. In these embodiments, a higher viscosity material is selectively applied to the same first class of first grooves and the higher viscosity material flows into the groove on top of the low viscosity material that is already present in the groove. In these embodiments, the lower viscosity material may be cured or dried prior to the addition of the higher viscosity material or after the addition of the higher viscosity material. This embodiment produces the grooves 90 of FIG. 1 where material 91 is the lower viscosity material is 91 and the higher viscosity material is 92. In these embodiments, the lower viscosity material typically has a viscosity of 1,000 cPs or less, and the higher viscosity material typically has a viscosity of 2,000 cPs or more. The lower and higher viscosity materials may be an ink, a pigment or a dye, and may be 100% solids, or may comprise at least one solvent, typically an organic solvent.

In other embodiments, a single first liquid material is utilized that has a high viscosity and is a liquid light absorbing material. The higher viscosity material is selectively applied to at least some of the first class of first grooves of the precursor optical film. In these embodiments, the higher viscosity material flows only part way into the groove, leaving an air-filled cavity or void in the bottom of the groove. This embodiment produces, for example, grooves 30 and 30*a* in FIG. 1. In these embodiments, the liquid first light absorbing material typically has a viscosity of 2,000 cPs or more. The liquid first light absorbing materials may be an ink, a pigment or a dye, and may be 100% solids, or may comprise at least one solvent, typically an organic solvent.

After the light absorbing material or materials are applied, the excess light absorbing material can be removed. The excess light absorbing material is that light absorbing material that is not contained within the first class of first grooves. The excess can be removed in a variety of ways such as wiping, vacuum extraction and the like. This removal of excess light absorbing material or materials is done before the material or materials are cured and/or dried. In some embodiments, the excess light absorbing material is not removed.

Regardless of whether the excess material is removed or not removed, additional steps can be carried out to the precursor optical film. In some embodiments, a second liquid material is applied to the precursor optical film. This second liquid material is different from the light absorbing material in that it is substantially transparent to light of each wavelength of the predetermined wavelength range. The second liquid material may be applied selectively to the locations of the second class of first grooves, or the second liquid material may be non-selectively applied to the surface of the precursor optical film. The second liquid material is then dried and/or cured.

Figure 7:
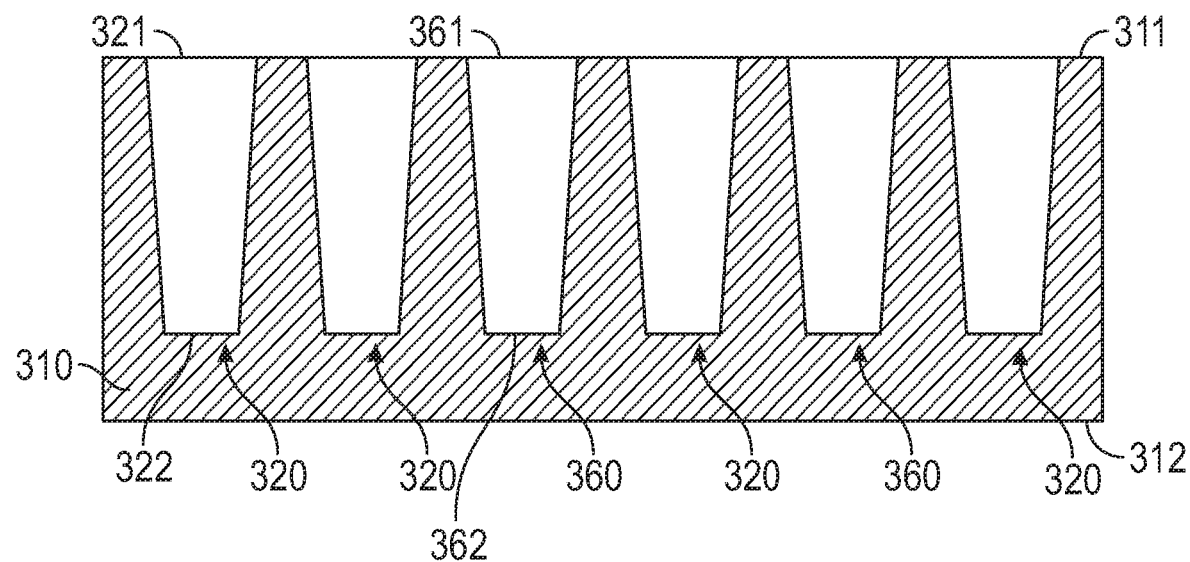
FIG. 7 is a cross-sectional view of an embodiment of a precursor optical film used to prepare a light control film of the present disclosure.
Figure 8:
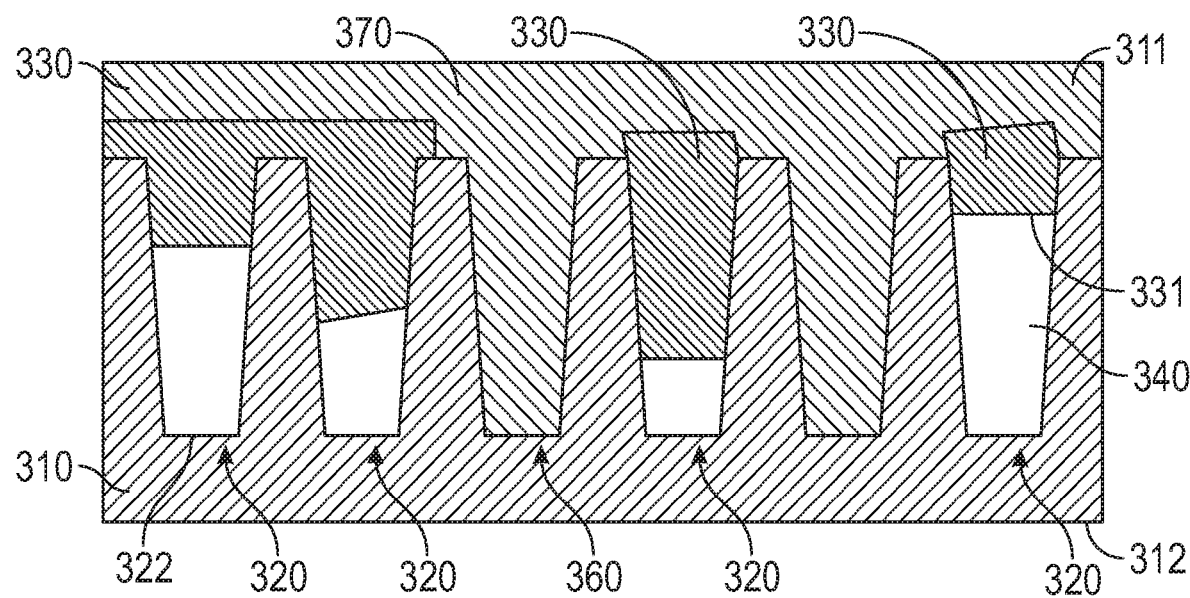
FIG. 8 is a cross-sectional view of another embodiment of a light control film of the present disclosure.
Figure 9:
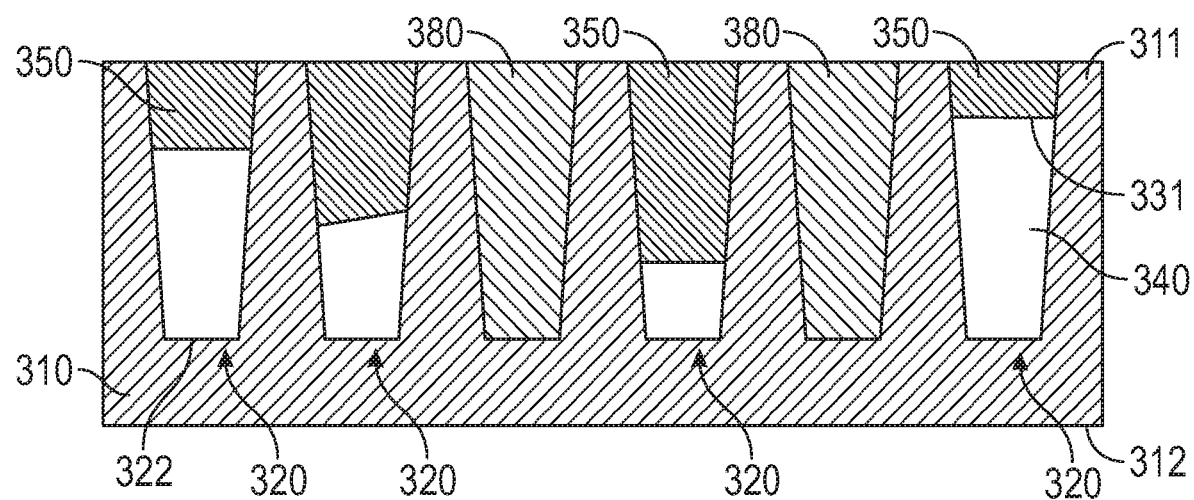
FIG. 9 is a cross-sectional view of another embodiment of a light control film of the present disclosure.

The methods of preparing the light control films of this disclosure are further illustrated by FIGS. 7-9. FIG. 7 shows a precursor optical film comprising an optical medium 310 with first major surface 311 and second major surface 312 and a plurality of spaced apart first class of first grooves 320. First grooves 320 comprise open tops 321 and closed bottoms 322. The optical film also comprises a plurality of a spaced apart second class of first grooves 360. The second class of first grooves 360 comprise open tops 361 and closed bottoms 362. In some embodiments, the first class of first grooves and second class of first grooves are the same. In other embodiments, the first class of first grooves and second class of first grooves are different. The grooves can be different in size, shape or length.

FIG. 8 shows a cross-sectional view of an optical film as in FIG. 7 that has been formed into a light control film of this disclosure. To the optical film of FIG. 7 has been applied a liquid light absorbing first material 330 selectively to the major top surface of the optical medium in the locations of first class of first grooves 320. The liquid first light absorbing material has been described above and substantially absorbs light of at least a first wavelength in a predetermined wavelength range extending from about 400 to about 600 nm, as shown in FIG. 2. The liquid first material is sufficiently viscous so as to only partially fill at least some of the first class of first grooves. The liquid first material partially fills the grooves and leaves an unfilled void region 340 inside the groove extending from a bottom surface 331 of the liquid first light absorbing material to the closed bottom of the groove 322. In the embodiment shown in FIG. 8, the excess liquid light absorbing first material was not removed. A second liquid material 370 is applied non-selectively to the major first surface 311 of the precursor optical article, and is a substantially transparent material. The second liquid material 370 fills the second class of first grooves 360 and also covers over the first light absorbing material 330. The liquid first light absorbing material and the second liquid material may each be an ink, a pigment, or a dye, and may be 100% solids, or may comprise a solvent, typically an organic solvent. The liquid first light absorbing material and the second liquid material can be independently dried and/or cured, or they can be dried and/or cured at the same time. In other words, the liquid first light absorbing material can be applied and dried and/or cured and then the second liquid material applied, or the liquid first light absorbing material can be applied, the second liquid material can be applied over the first light absorbing material, and then both materials can be dried and/or cured.

In the embodiments shown by FIG. 9, to the precursor optical film of FIG. 7, the liquid first light absorbing material is selectively applied to the first class of first grooves 320. In this embodiment, the liquid first material is sufficiently viscous so as to only partially fill at least some of the first class of first grooves. The liquid first material 350 partially fills the grooves and leaves an unfilled void region 340 inside the groove extending from a bottom surface 331 of the liquid first light absorbing material to the closed bottom of the groove 322. In the embodiment shown in FIG. 9, the excess liquid light absorbing first material was removed such that the first material 350 is not present outside of the first class of first grooves but rather the level of first light absorbing material 350 is essentially flush with surface 311. A second liquid material 380 is applied selectively to the major first surface 311 in the locations of second class of first grooves 360 of the precursor optical article, and is a substantially transparent material. The second liquid material 380 fills the second class of first grooves 360. Excess liquid second material 380 was removed such that the second material 380 is not present outside of the second class of first grooves but rather the level of second material 380 is essentially flush with surface 311. The liquid first light absorbing material and the second liquid material may each be an ink, a pigment or a dye, and may be 100% solids, or may comprises a solvent, typically an organic solvent. The liquid first light absorbing material and the second liquid material can be independently dried and/or cured, or they can be dried and/or cured at the same time. In other words, the liquid first light absorbing material can be applied and dried and/or cured and then the second liquid material applied, or the liquid first light absorbing material can be applied, the second liquid material can be applied over the first light absorbing material, and then both materials can be dried and/or cured.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wisconsin unless otherwise noted.

Resin compositions A through I were prepared by mixing the indicated components in the weight ratios listed in Table 1.

TABLE 1

Resin compositions.

| Resin | Color | Approx Viscosity, centipoise | Component Name | Parts by Weight | Supplier |
|---|---|---|---|---|---|
| A | Clear | 600 | PHOTOMER 6210 | 60 | IGM Resins, Charlotte, NC |
|   |   |   | SR 238 | 20 | Sartomer, Exton PA |
|   |   |   | SR 454 | 20 | Sartomer, Exton PA |
|   |   |   | IRGACURE TPO | 0.5 | BASF Corporation, Florham Park, NJ |
| B | Clear | 6300 | CN120 | 75 | Sartomer, Exton PA |
|   |   |   | SR 339 | 25 | Sartomer, Exton PA |
|   |   |   | DAROCUR 1173 | 0.25 | BASF Corporation, Florham Park, NJ |
|   |   |   | IRGACURE TPO | 0.1 | BASF Corporation, Florham Park, NJ |
| C | Clear | 9200 | PHOTOMER 6010 | 60 | IGM Resins, Charlotte, NC |
|   |   |   | SR 602 | 20 | Sartomer, Exton PA |
|   |   |   | SR 601 | 4 | Sartomer, Exton PA |
|   |   |   | SR 454 | 8 | Sartomer, Exton PA |
|   |   |   | SR 339 | 8 | Sartomer, Exton PA |
|   |   |   | IRGACURE TPO | 0.1 | BASF Corporation, Florham Park, NJ |
|   |   |   | DAROCUR 1173 | 0.35 | BASF Corporation, Florham Park, NJ |
|   |   |   | IRGANOX 1035 | 0.2 | BASF Corporation, Florham Park, NJ |
| D | Black | 15 | SR9003 | 96 | Sartomer, Exton PA |
|   |   |   | 9B1173 | 4 | Penn Color, Doylestown, PA |
|   |   |   | IRGACURE 819 | 1 | BASF Corporation, Florham Park, NJ |
|   |   |   | DAROCUR 1173 | 1 | BASF Corporation, Florham Park, NJ |
| E | Clear | 12 | SR 339 | 99 | Sartomer, Exton PA |
|   |   |   | DAROCUR 4265 | 1 | BASF Corporation, Florham Park, NJ |
| F | Clear | 13 | SR 339 | 66 | Sartomer, Exton PA |
|   |   |   | SR 9003 | 34 | Sartomer, Exton PA |
|   |   |   | DAROCUR 4265 | 1 | BASF Corporation, Florham Park, NJ |
| G | Clear | 15 | SR 9003 | 99 | Sartomer, Exton PA |
|   |   |   | DAROCUR 4265 | 1 | BASF Corp., Florham Park, NJ |
| H | Clear | 15 | SR 9003 | 95 | Sartomer, Exton PA |
|   |   |   | SR 454 | 5 | Sartomer, Exton PA |
|   |   |   | IRGACURE 819 | 1 | BASF Corporation, Florham Park, NJ |
|   |   |   | DAROCUR 1173 | 1 | BASF Corporation, Florham Park, NJ |
| I | Cyan | 15 | EFI VUTEk GSLXr 3M Superflex UV Ink |   | 3M Corporation, St Paul, MN |

A precursor optical film was prepared by molding and ultraviolet (UV) light curing resin C on a 0.076 millimeter thick polyethylene terephthalate (PET) film. For the precursor optical film, a cylindrically-shaped metal roll with finely detailed channels cut into its outer surface served as the mold. Resin mixture C was first coated onto the PET film, and then pressed firmly against the metal roll to completely fill the mold. Upon polymerization the precursor optical film was removed from the mold. The resulting structure in the cured resin was a series of evenly spaced grooves. The grooves had a maximum width of about 7 micrometers and a maximum depth of about 66 micrometers and were spaced at about a 56 micrometers pitch.

Example LCF film 1 was prepared by printing resin A onto the precursor optical film in a pattern using an Esiproof flexographic printer (available from Testing Machines, Inc. New Castle, DE) fitted with an 140/10 anilox roller and a patterned rubber roller, applying a bead of the overcoat resin C along the top of the printed precursor film, spreading overcoat resin C with a 0.12 millimeter thick stainless steel in the direction of the grooves in the precursor optical film, passing the printed and overcoated precursor optical film under ultraviolet light from a Fusion UV system fitted with a D bulb operating at 236 watts per centimeter at a speed of 7.6 meter per minute in a nitrogen purged environment.

Example LCF films 2 through 26 were prepared using the steps described for Example LCF 1 using the print resin, overcoat resin and Fusion bulb listed in Table 2.

TABLE 2

LCF Examples.

| Example | print resin | overcoat resin | Fusion Bulb | Transmitted | | Reflected | |
|---|---|---|---|---|---|---|---|
| | | | | On Axis | Off Axis | On Axis | Off Axis |
| 1 | A | C | D | Subtle | Subtle | Subtle | Visible |
| 2 | A | A | D | Subtle | Subtle | Subtle | Visible |
| 3 | A | B | D | Subtle | Subtle | Subtle | Visible |
| 4 | A | D | D | Visible | Visible | Visible | Visible |
| 5 | B | C | D | No | Subtle | Subtle | Visible |
| 6 | B | A | D | Subtle | visible | Subtle | Visible |
| 7 | B | B | D | Subtle | Subtle | Subtle | Visible |
| 8 | B | D | D | Subtle | Visible | Subtle | Visible |
| 9 | C | C | D | No | No | No | Subtle |
| 10 | C | A | D | Subtle | Subtle | Visible | Subtle |
| 11 | C | B | D | No | Subtle | Subtle | Subtle |
| 12 | C | D | D | Visible | Visible | Visible | Visible |
| 13 | D | C | D | Visible | Visible | Visible | Visible |
| 14 | D | A | D | Visible | Visible | Visible | Visible |
| 15 | D | B | D | Visible | Visible | Visible | Visible |
| 16 | D | D | D | No | No | No | No |
| 17 | E | D | H | Visible | Visible | Visible | Visible |
| 18 | F | D | H | Subtle | Visible | Subtle | Visible |
| 19 | G | D | H | Subtle | Visible | Subtle | Visible |
| 20 | H | D | H | Subtle | Visible | Subtle | Visible |
| 21 | E | F | H | Subtle | Subtle | Subtle | Subtle |
| 22 | F | F | H | Subtle | Subtle | Subtle | Subtle |
| 23 | G | F | H | Subtle | Subtle | Subtle | Subtle |
| 24 | F | E | H | Subtle | Visible | Subtle | Visible |
| 25 | F | G | H | Subtle | Visible | Subtle | Subtle |
| 26 | H | I | D | Visible | Visible | Visible | Visible |

Example LCF films were observed with a light behind the film with the film perpendicular to the light source (transmitted, on axis), with a light behind the film with the film rotated about the groove direction (transmitted, off axis), with a light source on the same side as the observer with the surface reflection perpendicular to the light source (reflected, on axis) and with the light source on the same side as the observer with the film rotated about the groove direction (transmitted, off axis). The visibility of the image printed on the example LCF films is summarized in Table 2.

What is claimed is:

1. A light control film comprising a plurality of spaced apart first grooves at least partially embedded in an optical medium between major first and second surfaces of the optical medium, wherein the plurality of spaced apart first grooves comprises a plurality of a spaced apart first class of first grooves and a plurality of a spaced apart second class of first grooves, each first groove having a closed bottom, a maximum height H in a thickness direction (z) of the light control film, and a maximum width W in a width direction (x) of the light control film perpendicular to the thickness direction, $H/W \geq 1$, wherein at least some of the first class of first grooves are partially filled with a light absorbing first material substantially absorbing light of a first predetermined wavelength range or of a first wavelength in the predetermined wavelength range, where the predetermined wavelength range is selected from the range extending from about 400 to about 2000 nm, the light absorbing first material defining an unfilled void region inside the first groove extending from a bottom surface of the light absorbing first material to the closed bottom of the first groove;

wherein a second liquid material fills the second class of first grooves.

2. The light control film of claim 1, wherein at least one first groove in the plurality of spaced apart first grooves comprises an open top, and wherein the light absorbing first material of the first groove extends to substantially the open top of the first groove.

3. The light control film of claim 1, wherein at least one first groove in the plurality of spaced apart first grooves comprises an open top, and wherein the light absorbing first material of the first groove extends from a bottom surface of the light absorbing first material to substantially the open top of the first groove.

4. The light control film of claim 1, wherein at least one first groove in the plurality of spaced apart first grooves comprises a closed top, and wherein the light absorbing first material of the first groove extends from a bottom surface of the light absorbing first material to substantially the closed top of the first groove.

5. The light control film of claim 1, wherein the light absorbing first material substantially absorbs light at each wavelength in the predetermined wavelength range.

6. The light control film of claim 1, wherein the first wavelength is between about 400 to about 1500 nm.

7. The light control film of claim 1 further comprising at least one second groove having an open top at the major first surface of the optical medium and an open bottom at the major second surface of the optical medium.

8. The light control film of claim 1, wherein each first groove has a maximum length L in a length direction (y) of the light control film perpendicular to the thickness and width directions, $L/H \geq 20$.

9. The light control film of claim 1, wherein for each first groove, the light absorbing first material fills between 20% to 70% of a total volume defined by the first groove.

10. The light control film of claim 1, wherein each first groove has a maximum length L in a length direction (y) of the light control film perpendicular to the thickness and width directions, and wherein at least two first grooves have different maximum lengths.

11. The light control film of claim 1, wherein the light absorbing first material substantially absorbs light at each wavelength in a wavelength range extending from about 400 to about 700 nm.

12. The light control film of claim 1, wherein the light absorbing first material substantially absorbs light in a single primary color wavelength range of a visible spectrum.

* * * * *